United States Patent
Ikeda (10) Patent No.: US 10,126,992 B2
(45) Date of Patent: Nov. 13, 2018

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Atsushi Ikeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/224,239

(22) Filed: Jul. 29, 2016

(65) Prior Publication Data

US 2017/0060502 A1 Mar. 2, 2017

(30) Foreign Application Priority Data

Aug. 28, 2015 (JP) .................................. 2015-169730

(51) Int. Cl.
*G06F 3/12* (2006.01)
*H04N 1/00* (2006.01)

(52) U.S. Cl.
CPC .......... *G06F 3/1238* (2013.01); *G06F 3/1222* (2013.01); *H04N 1/00408* (2013.01); *H04N 1/00477* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2006/0268323 A1* | 11/2006 | Hashimoto | ........... | G06F 3/1222 358/1.15 |
| 2009/0190166 A1* | 7/2009 | Nakamura | ........... | G06F 3/1219 358/1.15 |
| 2012/0293835 A1* | 11/2012 | Amano | ................... | G06F 3/121 358/1.15 |
| 2014/0211240 A1* | 7/2014 | Maki | ..................... | G06F 3/1222 358/1.14 |
| 2015/0092233 A1* | 4/2015 | Park | ..................... | G06F 3/1288 358/1.15 |
| 2016/0295052 A1* | 10/2016 | Tao | .......................... | B41J 29/00 |

FOREIGN PATENT DOCUMENTS

| | | |
|---|---|---|
| JP | 4748176 B2 | 8/2011 |
| JP | 2013-67028 A | 4/2013 |
| JP | 2015-196304 A | 11/2015 |

* cited by examiner

*Primary Examiner* — Helen Zong
(74) *Attorney, Agent, or Firm* — Fitzpatrick, Cella, Harper & Scinto (57) ABSTRACT

An image processing apparatus includes a storage to store print data, a display device to display information, and at least one processor that executes a set of instructions. The instructions when executed, cause the apparatus to perform operations including receiving a predetermined user operation for printing, and specifying a user logging into the image processing apparatus. In a particular case, the display device is caused to display a print screen for receiving a user instruction to the stored print data. In another case, the display device is caused to display a confirmation screen for indicating a usage status of the storage. The confirmation screen is configured to include at least user information indicating users associated with the print data stored in the storage, and not to include information indicating a name of the print data stored in the storage.

13 Claims, 7 Drawing Sheets

USERS CURRENTLY USING THE SPOOLER

THE SPOOLER IS BEING USED FOR THE JOBS OF THE FOLLOWING USERS.

ikeda kitagawa sasaki

USERS CURRENTLY USING THE SPOOLER

A NEW JOB CANNOT BE ACCEPTED UNTIL PRINTING IS EXECUTED OR TIME HAS ELAPSED.

ikeda        APPROX. 5 MINUTES kitagawa    APPROX. 3 MINUTES sasaki       APPROX. 1 MINUTE

NO STORAGE OF JOB NOTIFICATION

YOUR JOB HAS NOT BEEN ACCEPTED. YOUR JOB MAY BE SUSPENDED

OK

IMAGE PROCESSING APPARATUS, CONTROL METHOD THEREOF, AND STORAGE MEDIUM

BACKGROUND OF THE INVENTION

Field of the Invention

The present invention relates to an image processing apparatus, a control method thereof, and a storage medium.

Description of the Related Art

Among printing apparatuses (image processing apparatuses) such as copying machines and multi-function peripherals of recent years, there is an apparatus that includes a print function which temporarily stores a transmitted print job in the apparatus and executes the print job in accordance with the instruction input from a user on the apparatus (see Japanese Patent Laid-Open No. 2013-67028). In a printing apparatus that has the print function, a list of print jobs stored in the apparatus is displayed, and a print job that is to be executed can be selected by the user based on the displayed list.

In such a printing apparatus, if there is no storage area to store the print jobs, a print job transmitted from the user cannot be stored in the apparatus. In such a case, the print job transmitted from the user is not displayed on the list of print jobs stored in the apparatus. However, since the list of print jobs already stored in the apparatus is displayed, the user can know the reason, such as the lack of storage area in the apparatus or the like, why the transmitted print job is not displayed.

On the other hand, among printing apparatuses, there is an apparatus that includes, in addition to the above-described print function, a user authentication function which allows only an authenticated user to use the apparatus. In this kind of a printing apparatus, since the user using the apparatus will be identified by the user authentication function, it is preferable to display, from the perspective of usability, a list that includes only the print jobs transmitted from authenticated users and stored in the apparatus.

Here, assume a case in which the storage area for storing print jobs runs out in the apparatus and a print job transmitted from the authenticated user cannot be stored in a printing apparatus that includes the user authentication function. In this case, in the printing apparatus, neither the print job transmitted from the authenticated user nor a list of print jobs which are transmitted from other users and already stored in the apparatus is displayed. Therefore, the authenticated user cannot know the reason why the transmitted print job is not displayed, and it becomes difficult to take a measure to display the print job.

SUMMARY OF THE INVENTION

The present invention provides a technique advantageous in, for example, notifying an authenticated user of the reason why a print job transmitted by the authenticated user is not displayed.

According to one aspect of the present invention, there is provided an image processing apparatus used in an image processing system which includes a storage unit configured to store print data received from an external apparatus, the storage unit capable of storing print data associated with an input user, a display unit configured to display information to an operation user, and an authentication unit configured to authenticate the operation user as the input user, the image processing apparatus comprising: a control unit configured to perform control processing based on a program and including at least one memory which stores the program and at least one processor which executes the program, wherein the control unit is configured to execute processing to cause the display unit to display, in a case where print data associated with a user authenticated by the authentication unit has been stored in the storage unit, a list of the print data associated with the authenticated user out of the print data stored in the storage unit, and processing to cause the display unit to display, in a case where print data associated with a user different from the user authenticated by the authentication unit has been stored in the storage unit, information related to the different user.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings. Note that the same reference numerals denote the same members throughout the drawings, and a repetitive description thereof will not be given. Although an example of a printing apparatus (image processing apparatus) called an MFP (Multi Function Peripheral) which includes, for example, a plurality of functions such as copying, printing, scanning, and facsimile functions will be described in the following embodiments, the present invention is not limited to this. The present invention is also applicable to, for example, a printing apparatus (image processing apparatus) called an SFP (Single Function Peripheral) that is only capable of printing.

First Embodiment

Figure 1:
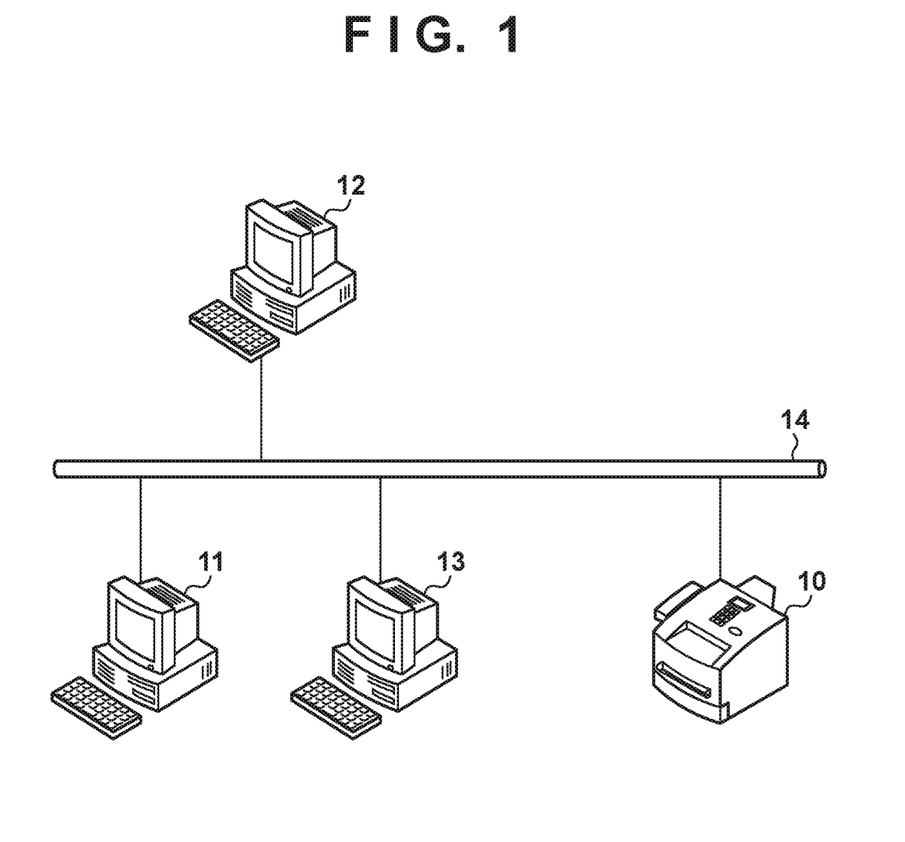
FIG. 1 is a schematic view showing a use environment of a printing apparatus.

A printing apparatus 10 (MFP) according to the first embodiment of the present invention will be described. First, the use environment of the printing apparatus 10 according to first embodiment will be described with reference to FIG. 1. FIG. 1 is a schematic view showing a use environment of the printing apparatus 10.

The printing apparatus 10 is connected to a plurality of clients 11 to 13 via a LAN 14. Print jobs are generated in the respective clients 11 to 13 and are transmittable to the printing apparatus 10 via the LAN 14. Here, although an example in which three clients are connected to the printing apparatus 10 via the LAN 14 is shown in FIG. 1, the present invention is not limited to this. The present invention is applicable as long as one or more clients are connected to the printing apparatus 10 via the LAN 14. Additionally, although an example in which the clients are connected to the printing apparatus 10 via the LAN 14 is shown in FIG. 1, the present invention is not limited to this. For example, the clients can be connected to the printing apparatus 10 via a wireless LAN or a USB cable.

Figure 2:
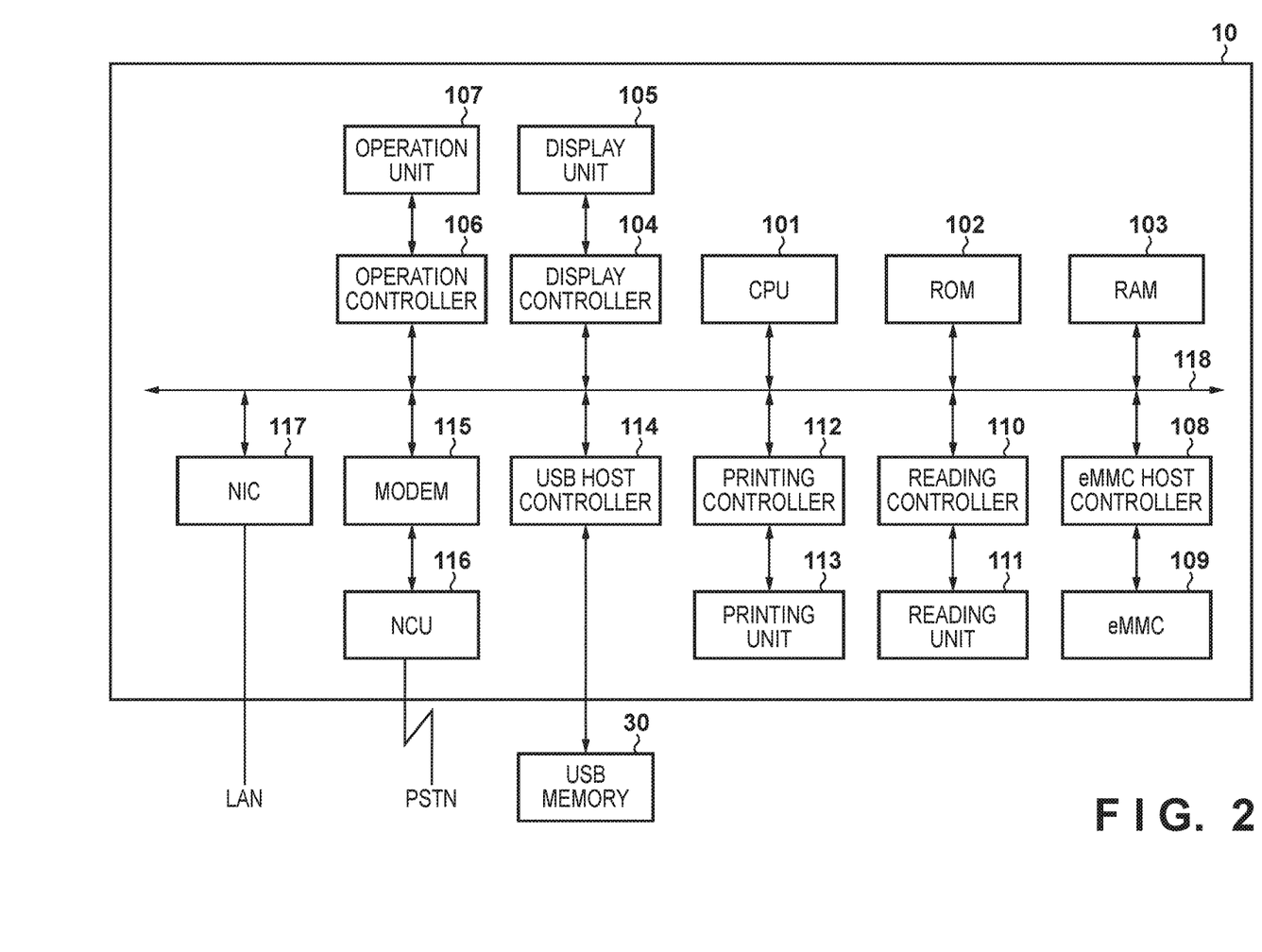
FIG. 2 is a block diagram showing an example of the hardware arrangement of the printing apparatus.

The apparatus arrangement of the printing apparatus 10 according to the first embodiment will be described next with reference to FIG. 2. FIG. 2 is a block diagram showing an example of the hardware arrangement of the printing apparatus 10. The printing apparatus 10 can include, for example, a CPU 101, a ROM 102, a RAM 103, a display controller 104, a display unit 105, an operation controller 106, and an operation unit 107. The printing apparatus 10 can also include an eMMC host controller 108, an eMMC 109, a reading controller 110, a reading unit 111, a printing controller 112, and a printing unit 113. Furthermore, the printing apparatus 10 can include a USB host controller 114, a MODEM 115, a network control unit (NCU 116), and a network interface card (NIC 117).

The CPU 101 comprehensively controls each unit of the printing apparatus 10 via a system bus 118. When a power supply voltage is supplied to the CPU 101, the CPU 101 executes a boot program stored in the ROM 102. Normally, the boot program loads, to the RAM 103, a main program saved in storage and jumps to the start of the loaded main program. The RAM 103 functions as a main program loading area and as a main program work area.

The display controller 104 controls the display on the display unit 105. The display unit 105 can be formed by, for example, a liquid crystal display (LCD) that can display a character string, a ruled line, a scrollbar, and the like. The operation controller 106 controls the input from the operation unit 107 provided in the printing apparatus 10. The operation unit 107 can be formed by, for example, a ten-key pad, cursor keys, a one-touch key, and the like.

The reading unit 111 performs reading of an original. The reading unit 111 can optionally include, for example, an automatic document feeder (not shown) so that a plurality of originals can be read automatically. The reading unit 111 is connected to the reading controller 110, and the CPU 101 exchanges information with the reading unit 111 via the reading controller 110. Additionally, the printing unit 113 prints (forms) an image on a printing paper (sheet) by, for example, an electrophotographic method. The printing unit 113 is connected to the printing controller 112, and the CPU 101 exchanges information with the printing unit 113 via the printing controller 112.

The USB host controller 114 performs USB protocol control and mediates the access to a USB device such as a USB memory 30. The MODEM 115 performs signal modulation/demodulation necessary for facsimile communication. The MODEM 115 is connected to the NCU 116, and the signal modulated by the MODEM 115 is transmitted to a telephone public circuit network (PSTN) via the NCU 116. The NIC 117 performs bidirectional exchange of data with an email server or a file server via the LAN. Additionally, the printing apparatus 10 according to the first embodiment includes an eMMC 109 as the storage. The CPU 101 accesses the eMMC 109 via the eMMC host controller 108.

Figure 3:
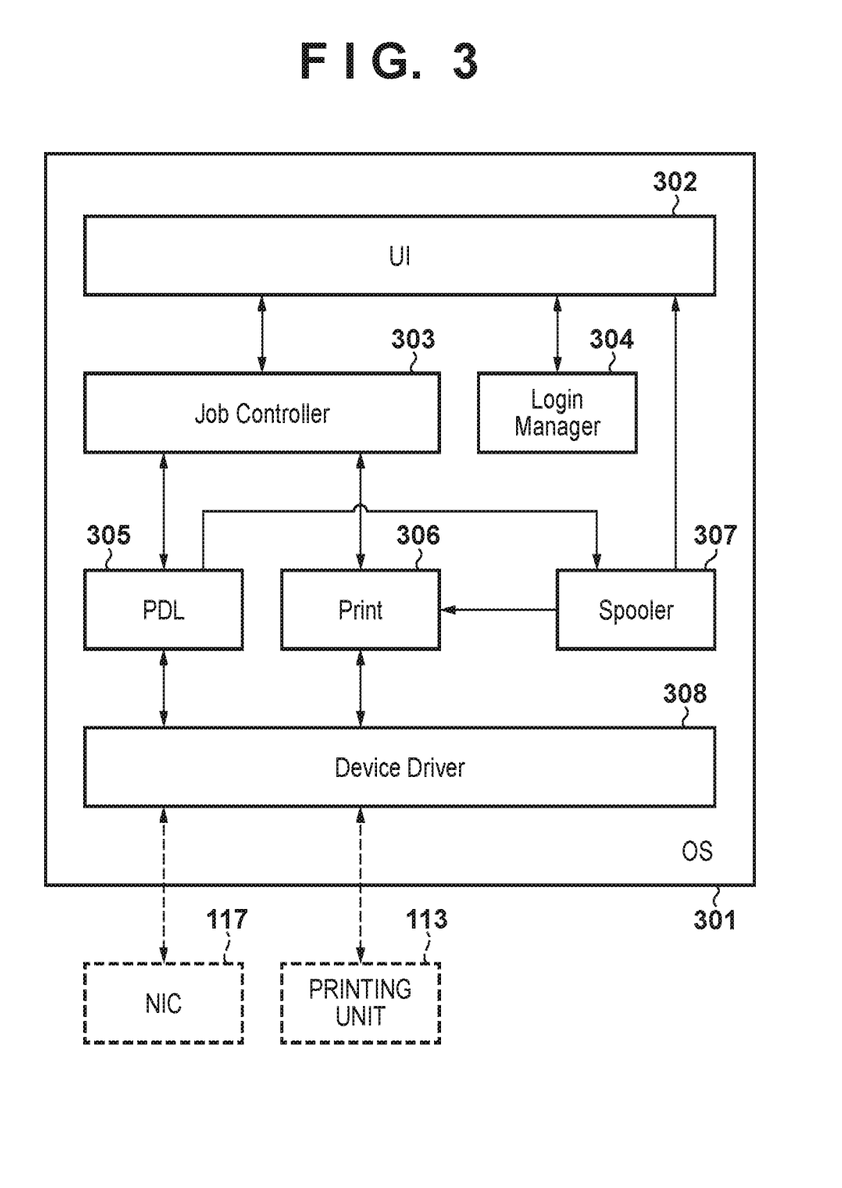
FIG. 3 is a block diagram showing an example of the arrangement of a software module of the printing apparatus.

The software arrangement of the printing apparatus 10 will be described next with reference to FIG. 3. FIG. 3 is a block diagram showing an example of the software module arrangement of the printing apparatus 10. Each module indicated by a solid line in FIG. 3 is a software module which can be implemented by causing the CPU 101 to execute a main program (boot program) loaded on the RAM 103. Here, the printing apparatus 10 according to the first embodiment is formed so as to include a user authentication function which performs user authentication and a print function which executes a print job, which is stored in the apparatus together with a user name, according to an instruction input from a user.

In the main program, the execution of each module can be managed and controlled by an OS (Operating System) module 301. For example, a UI module 302, a job controller module 303, a login manager module 304, a PDL module 305, a print module 306, a spooler module 307, and a device driver module 308 can be provided in the OS module 301. The device driver module 308 mediates the exchange of information with a hardware device such as the NIC 117 or the printing unit 113.

Figure 5:
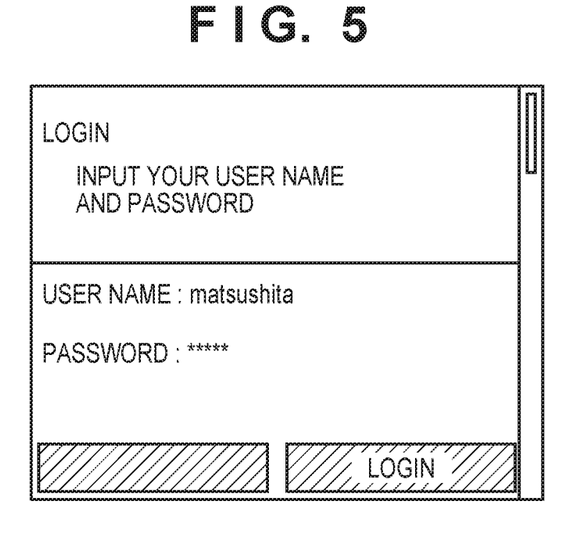
FIG. 5 is a view showing an example of an authentication request screen.

The UI (User Interface) module 302 provides various kinds of information to the user via the display unit 105 and the operation unit 107 and accepts various kinds of instructions from the user. Here, the printing apparatus 10 according to the first embodiment includes a user authentication function that performs user authentication and is formed so that the enable/disable state of the user authentication function can be switched by a user who has been given administrative authority. If the user authentication function is enabled, input of a user name and a password is prompted by the UI module 302, and the printing apparatus 10 becomes only usable for an authenticated user. FIG. 5 is a view showing an example of an authentication request screen which is displayed on the display unit 105 to prompt the user to input a user name and password. Here, the printing apparatus 10 may be formed so that the methods to authenticate the user, such as authentication by user selection by an icon and password input, authentication by holding a noncontact card over a card reader, and the like, can be switched by the user having administrative authority.

The job controller module 303 accepts jobs such as copy, print, or fax and controls the execution of the accepted job. If the user authentication function is enabled, the login manager module 304 supplies the information necessary for user authentication to the UI module 302 or the like. Then, when the user inputs the user name and the password to the UI module 302, the login manager module 304 performs user authentication (login) and manages the context unique to the user such as the user name and email address if the authentication is successful.

Figure 6:
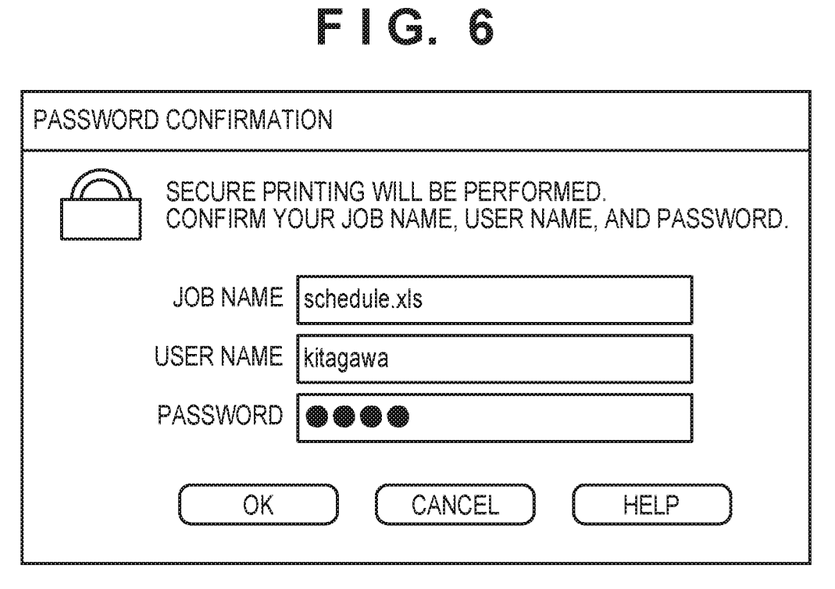
FIG. 6 is a view showing an input screen which is displayed on a display of each client by a printer driver.

The PDL module 305 accepts page description language data of a print job transmitted from each of the clients 11 to 13 via the NIC 117. Here, in the first embodiment, when a print job is transmitted from each client to the printing apparatus 10, an input screen shown in FIG. 6 is displayed on the display of each client by the printer driver. A password for each print job can be accordingly set to each print job in addition to the document name (job name) and the user name. Here, although an example of setting a password to a print job is described in the first embodiment, setting a password to a print job is not always necessary since, for example, the user who is to use the apparatus has been identified by the user authentication function. Note that a print job that has been set with a password is generally called a secure print job.

The print job (page description language data) accepted by the PDL module 305 is stored in the spooler module 307. Here, the spooler module 307 (storage module) which stores the print job can be, for example, allocated to the RAM 103. If there is no storage area to store the print job in the spooler module 307, the PDL module 305 rejects the acceptance of the print job. The print job whose acceptance has been rejected is suspended in the client. The data storage amount and free area of the spooler module 307 are managed by the CPU 101. The CPU 101 can display a remaining memory amount warning on the display unit 105 if the free area of the spooler module 307 becomes less than a predetermined value (for example, less than 5%).

The print module 306 reads out the PDL data of the print job stored in the spooler module 307 based on an instruction from the job controller module 303. Then, upon generating a print image from the readout PDL data and transmitting the generated printing image to the printing unit 113, printing according to the print job can be executed.

Figure 4:
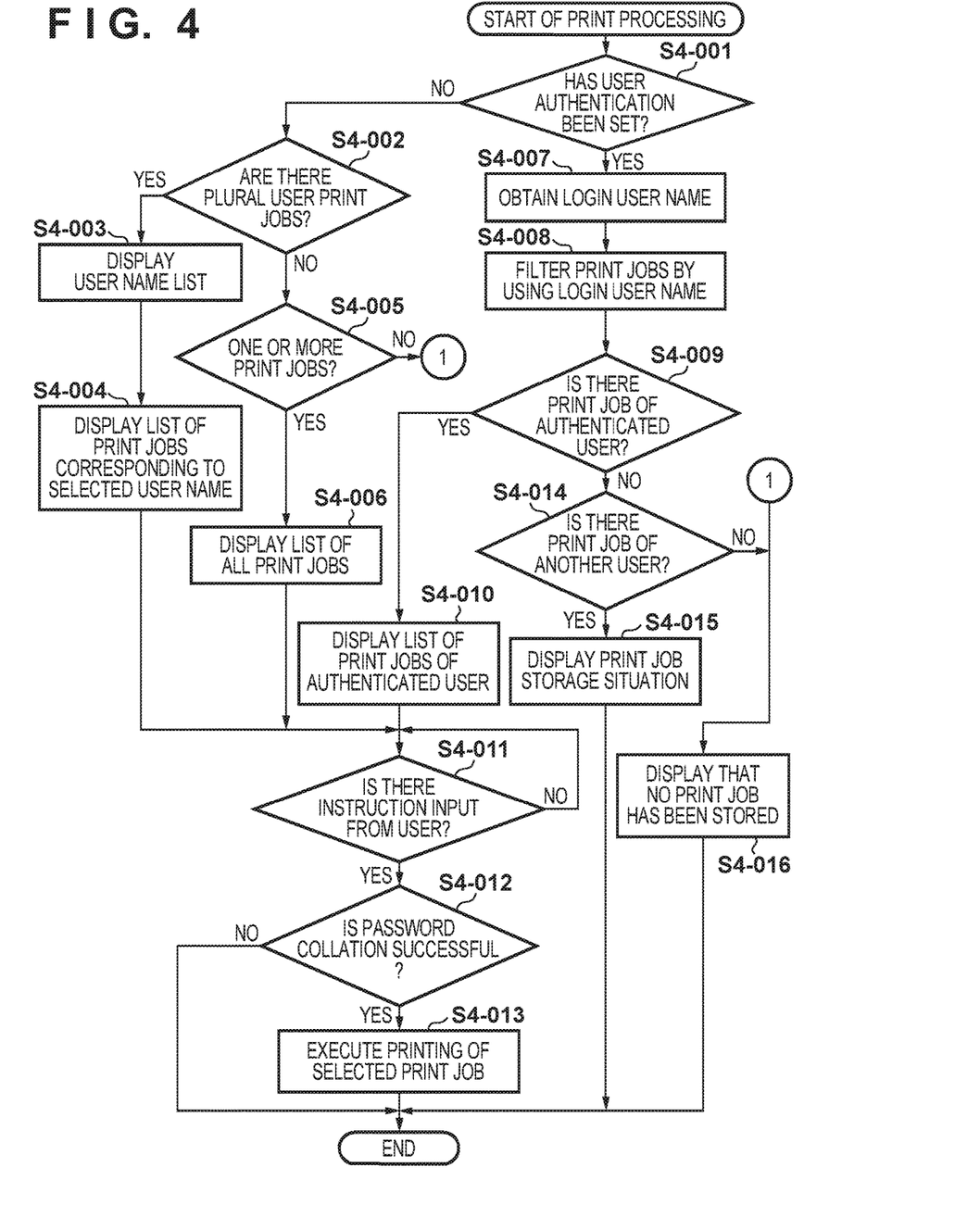
FIG. 4 is a flowchart for explaining print processing.

Print processing in the printing apparatus 10 according to the first embodiment will be described next with reference to FIG. 4. FIG. 4 is a flowchart showing the print processing of the printing apparatus 10 according to the first embodiment. Note that the processing to be described below is implemented by causing the CPU 101 to read out a control program pre-stored in the ROM 102 to the RAM 103 and execute the control program. Additionally, printing in the print processing can be executed when the user presses a print button displayed on display unit 105.

In step S4-001, the printing apparatus 10 confirms whether the user authentication function has been enabled. If the user authentication function is disabled (NO in step S4-001), the print processes shown in steps S4-002 to S4-006 are executed.

Figure 7:
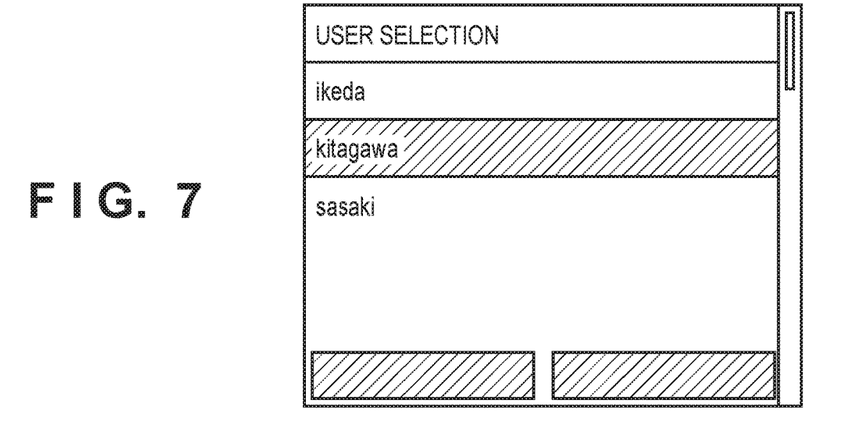
FIG. 7 is a view showing a display example of a user name list.

In step S4-002, the printing apparatus 10 determines whether print jobs of a plurality of users are stored in the spooler module 307. If it is determined that the print jobs of a plurality of users are stored in the spooler module 307, the process advances to step S4-003. In step S4-003, the printing apparatus 10 displays, on the display unit 105, the user name list of the print jobs stored in the spooler module 307. FIG. 7 is a view showing a display example of the user name list. The display example shown in FIG. 7 indicates that print jobs of three users, "ikeda", "kitagawa", and "sasaki, are stored in the spooler module 307.

Figure 8:
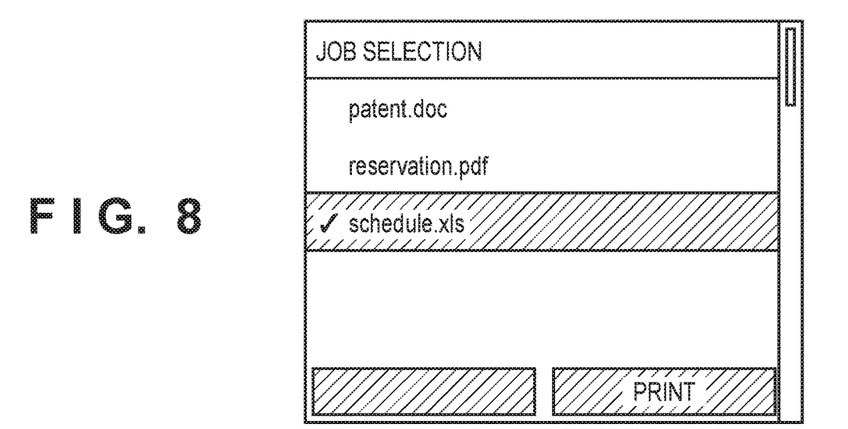
FIG. 8 is a view showing an example of a print job list.

In step S4-004, the printing apparatus 10 uses the user name selected from the list displayed in step S4-003 to filter the print jobs stored in the spooler module 307. Then, a list of print jobs obtained by filtering is displayed on the display unit 105. That is, the printing apparatus 10 extracts, from the print jobs stored in the spooler module 307, the print jobs corresponding to the selected user name and displays the extracted print job list on the display unit 105. FIG. 8 is a view showing an example of a print job list displayed on the display unit 105.

In contrast, in step S4-002, if is determined that the print jobs of a plurality of users are not stored in the spooler module 307, the process advances to step S4-005. In step S4-005, the printing apparatus 10 determines whether one or more print jobs are stored in the spooler module 307. If it is determined that one or more print jobs are stored in the spooler module 307, the process advances to step S4-006. Otherwise, the process advances to step S4-016. In step S4-006, the printing apparatus 10 displays, on the display unit 105, a list of all the print jobs stored in the spooler module 307.

Here, if there is no storage area in the spooler module 307 to store the print jobs, the printing apparatus 10 cannot store the print job transmitted from a user in the apparatus. In this case, the print job transmitted from the user is not displayed on the list of print jobs already stored in the apparatus. However, in this case, the user can refer to the list displayed in step S4-003 or the list displayed in step S4-006. From this, the user can know the reason why the transmitted print job is not displayed such as the lack of storage area for storing the print job in the spooler module 307.

If, in step S4-001, the user authentication function is enabled (YES in step S4-001), the print processes shown in steps S4-007 to S4-0015 are executed.

In step S4-007, the printing apparatus 10 obtains the user name (login user name) managed by the login manager module 304, that is, the user name of the user (to be referred to as authenticated user hereinafter) authenticated by the user authentication function. In step S4-008, the printing apparatus 10 uses the user name obtained in step S4-007 to filter the print jobs stored in the spooler module 307.

In step S4-009, the printing apparatus 10 determines, from the filtering result in step S4-008, whether the print job transmitted from the authenticated user (first user) is stored in the spooler module 307. If it is determined that the print job transmitted from the authenticated user is stored in the spooler module 307, the process advances to step S4-010. In step S4-010, the printing apparatus 10 displays, on the display unit 105, a list of print jobs transmitted from the authenticated user and stored in the spooler module 307. The print job list displayed on the display unit 105 in step S4-010 is the same as the list (FIG. 8) displayed on the display unit 105 in step S4-004.

In step S4-011, the printing apparatus 10 determines whether the user has selected a print job to execute from the list displayed on the display unit 105 and has pressed the print button displayed on the display unit 105. That is, the printing apparatus 10 determines whether an instruction input to execute the print job has been performed by the user. If the instruction input has not been performed by the user, step S4-011 is repeated. Otherwise, the process advances to step S4-012. Here, in step S4-011, a print job which is to be executed can be selected by the user from the list displayed on the display unit 105 in step S4-004, S4-006, or S4-010.

Figure 9:
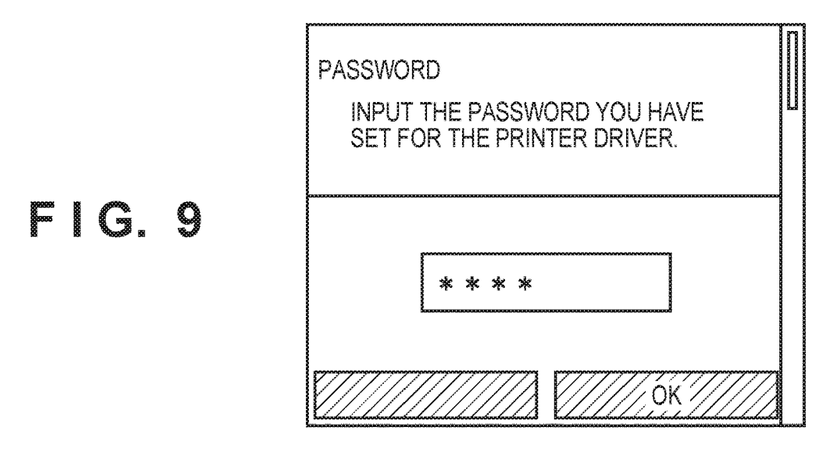
FIG. 9 is a view showing a screen for a user to input a password.

In step S4-012, as shown as in FIG. 9, the printing apparatus 10 displays, on the display unit 105, a screen to prompt the user to input the password of the print job to be executed. FIG. 9 is a view showing the screen that prompts the user to input the password of the print job to be executed. When the password is input by the user, the input password and the password set by the printer driver at the time when the print job is transmitted from the client to the printing apparatus 10 are collated. If the collation succeeds (YES in S4-012), the process advances to step S4-013. If the collation fails (NO in step S4-012), the process ends. In step S4-013, printing of the print job selected in step S4-011 is executed.

In step S4-009, if it is determined that the print job transmitted from the authenticated user is not stored in the spooler module 307, the process advances to step S4-014. In step S4-014, the printing apparatus 10 determines whether a print job that has been transmitted from another user (second user) different from the authenticated user is stored in the spooler module 307. If a print job that has been transmitted from the other user is stored in the spooler module 307, the process advances to step S4-015. Otherwise, the process advances to step S4-016.

Here, a case when the spooler module 307 runs out of the storage area for storing print job and the print job transmitted from the authenticated user is not stored in the apparatus will be described. In this case, as described above, the print job transmitted from the user is not displayed in the list of print jobs already stored in the apparatus. If the user authentication function is disabled, the user can, as described above, know the reason why the transmitted print job is not displayed by referring to the list displayed in step S4-003 or step S4-006. However, if the user authentication function is enabled, not only the list of print jobs transmitted from authenticated users but also the list of print jobs transmitted from other users and already stored in the apparatus is not displayed. Hence, the authenticated user cannot know the reason why the transmitted print job is not displayed, and it can become difficult to take a measure to display the print job.

Therefore, in step S4-015, the printing apparatus 10 displays the print job storage situation of the printing apparatus 10 on the display unit 105. The print job storage situation can include, for example, the situation of print jobs already stored in the apparatus, the situation of whether the transmitted print job can be stored in the apparatus, the situation of print jobs that could not be stored in the apparatus, and the like. The authenticated user can know the reason why the transmitted print job is not displayed.

Figure 10:
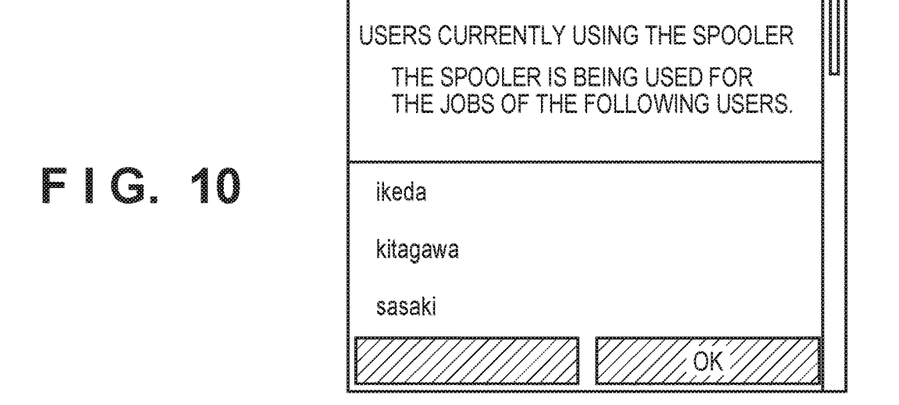
FIG. 10 is a view showing an example of a print job storage situation display.

For example, as shown in FIG. 10, the printing apparatus 10 can display, on the display unit 105, the user name corresponding to each print job stored in the spooler module 307 as the print job storage situation. FIG. 10 is a view showing a display example of the print job storage situation. In the example shown in FIG. 10, the user names "ikeda", "kitagawa", and "sasaki" are displayed. From this display, the authenticated user can know that the storage area for storing transmitted print jobs has run out because the print jobs of these three users are stored in the apparatus. Note that it can be set so that the aforementioned display screen can be confirmed even in a case in which the print jobs transmitted from authenticated users are stored in the apparatus. In such a case, it is preferable for the screen to be selectively displayed from a management screen that is different from the printing instruction screen. Additionally, the user names displayed on the aforementioned display screen can be displayed in a format such as a notification bar. For example, the notification bar can be displayed so that it is superimposed on a part of the job selection screen of FIG. 8.

The printing apparatus 10 can also display, on the display unit 105, a list of print jobs stored in the spooler module 307 as the print job storage situation. By displaying the print job storage situation in this manner, the authenticated user can know the reason why the transmitted print job is not displayed and take, for example, a measure such as prompting print job execution to the user displayed on the display unit 105.

On the other hand, in step S4-016, the printing apparatus 10 displays on the display unit 105 that print jobs are not stored in the spooler module 307 (in the apparatus). The printing apparatus 10 can indicate that print jobs are not stored in the apparatus, for example, by displaying a character string or a blank screen.

The first embodiment has described an example in which the user authentication function is implemented by the UI module 302 incorporated in the main program. However, the user authentication function is not limited to software incorporated in the main program. For example, the present invention is applicable to an arrangement in which the printing apparatus 10 includes a virtual machine and the user application function is implemented as an application that operates on the virtual machine.

Second Embodiment

Figure 11:
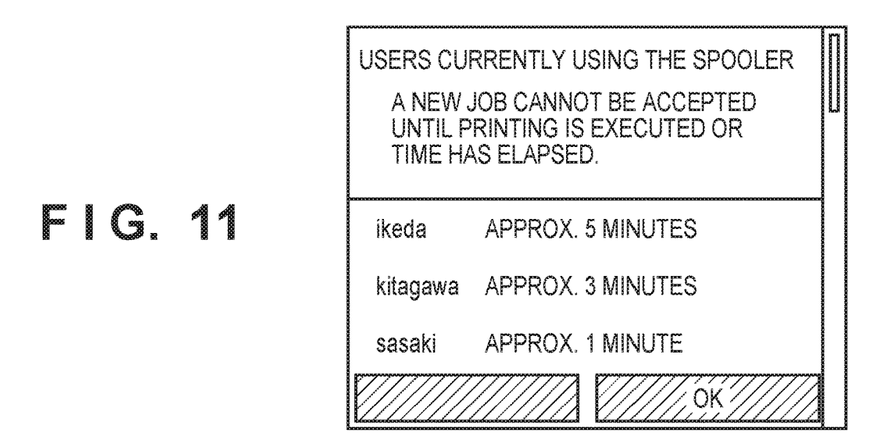
FIG. 11 is a view showing an example of a print job storage situation display.

The aforementioned print function in a printing apparatus 10 may have a delete function that automatically deletes print jobs which are stored in a spooler module 307 and not executed for a predetermined time. In this case, in step S4-015, as shown in FIG. 11, the printing apparatus 10 can display, as the storage situation, the time until each print job is deleted in addition to the user name of each print job stored in the spooler module 307. This will allow the authenticated user to know, in addition to the reason why the transmitted print jobs is not displayed, how long to wait for the print job to be stored in the spooler module 307.

Third Embodiment

Figure 12:
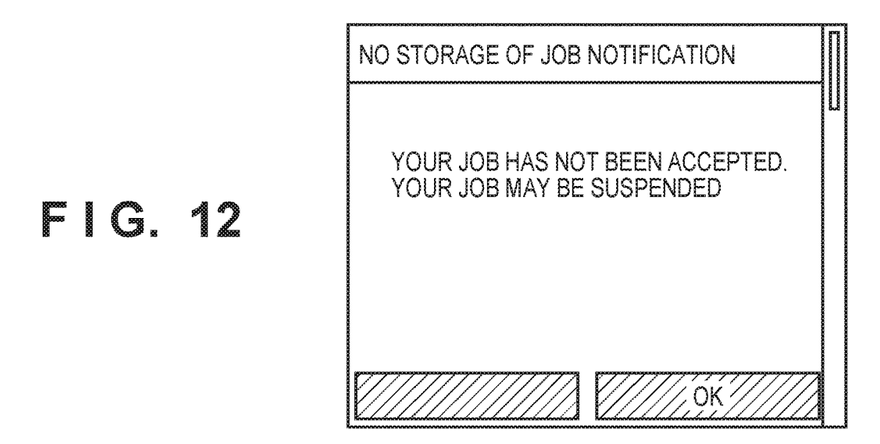
FIG. 12 is a view showing an example of a print job storage situation display.

In the first embodiment, in step S4-015, an example in which a list of user names using the spooler module 307 is displayed as the print job storage situation has been described. However, the present invention is not limited to this, and any method can be used as long as the authenticated user can know the reason why the transmitted print job is not displayed. For example, as shown as in FIG. 12, a printing apparatus 10 can display, on a display unit 105, that the print job transmitted from the authenticated user cannot be stored in the apparatus as the storage situation. In the example shown in FIG. 12, character strings indicating that the print job of the authenticated user is not stored in the apparatus and that the print job may be suspended are displayed as the storage situation. In addition, the printing apparatus 10 can display that there is no storage area in a spooler module 307 to store the print job transmitted from the authenticated user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-169730 filed on Aug. 28, 2015, which is hereby incorporated by reference herein in its entirety.

What is claimed is:

1. An image processing apparatus comprising:
   (a) a storage configured to store print data;
   (b) a display device configured to display information; and
   (c) at least one processor that executes a set of instructions to cause the image processing apparatus to perform operations comprising:
      (i) receiving a predetermined user operation for printing;
      (ii) specifying a user logging into the image processing apparatus;
      (iii) in a case in which the predetermined user operation has been received and print data associated with the specified user has been stored in the storage, causing the display device to display a print screen for receiving a user instruction to the stored print data; and
      (iv) in a case in which the predetermined user operation has been received and the print data associated with the specified user has not been stored in the storage and print data associated with different users from the specified user has been stored in the storage, causing the display device to display a confirmation screen,
   wherein the confirmation screen is configured to include at least user information indicating users associated with the print data stored in the storage, and not to include information indicating a name of the print data stored in the storage.

2. The image processing apparatus according to claim 1, wherein the user information is information indicating names of the users associated with the print data stored in the storage.

3. The image processing apparatus according to claim 1, wherein the confirmation screen further includes a display area for displaying a message indicating that the storage is storing print data associated with the different users from the specified user.

4. The image processing apparatus according to claim 1, wherein the at least one processor, when executing the instructions, causes the image processing apparatus to perform further operations for displaying a notification screen indicating that no print data is stored in the storage in a case in which no print data is stored in the storage.

5. The image processing apparatus according to claim 1, wherein the confirmation screen includes a display area for displaying information indicating a remaining time until at least one print data of the print data stored in the storage is automatically deleted.

6. The image processing apparatus according to claim 5, wherein the information indicating the remaining time is arranged in correspondence with identification information of another user whose associated print data is to be automatically deleted.

7. The image processing apparatus according to claim 1, wherein, in a case in which print data received from an external apparatus includes a setting requiring a user operation, the at least one processor, when executing the instructions, causes the image processing apparatus to perform further operations for storing the received print data into the storage.

8. The image processing apparatus according to claim 1, wherein, in a case in which print data received from an external apparatus includes a password, the at least one processor, when executing the instructions, causes the image processing apparatus to perform further operations for storing the received print data into the storage.

9. The image processing apparatus according to claim 1, wherein the at least one processor, when executing the instructions, causes the image processing apparatus to perform further operations for rejecting print data transmitted from an external apparatus, in a case in which the storage cannot store additional print data.

10. The image processing apparatus according to claim 1, further comprising a card reader,
    wherein the at least one processor, when executing the instructions, causes the image processing apparatus to perform further operations for executing a user authentication by using the card reader.

11. The image processing apparatus according to claim 1, further comprising an image forming device that forms an image on a sheet,
    wherein the at least one processor, when executing the instructions, causes the image processing apparatus to perform further operations for forming the image on the sheet using the image forming device based on print data selected from a list of print data displayed by the display device.

12. A control method of controlling an image processing apparatus having a storage configured to store print data, and a display device configured to display information, the method comprising:
    receiving a predetermined user operation for printing;
    specifying a user logging into the image processing apparatus;
    causing, in a case in which the predetermined user operation has been received and print data associated with the specified user has been stored in the storage, the display device to display a print screen for receiving a user instruction to the stored print data; and
    causing, in a case in which the predetermined user operation has been received and the print data associated with the specified user has not been stored in the storage and print data associated with different users from the specified user has been stored in the storage, the display device to display a confirmation screen,
    wherein the confirmation screen is configured to include at least information indicating users associated with the print data stored in the storage, and not to include information indicating a name of the print data stored in the storage.

13. A non-transitory computer-readable storage medium storing a program for causing a computer to execute each step of a control method of controlling an image processing apparatus having a storage configured to store print data, and a display device configured to display information, the method comprising:
    receiving a predetermined user operation for printing;
    specifying a user logging into the image processing apparatus;

causing, in a case in which the predetermined user operation has been received and print data associated with the specified user has been stored in the storage, the display device to display a print screen for receiving a user instruction to the stored print data; and causing, in a case in which the predetermined user operation has been received and the print data associated with the specified user has not been stored in the storage and print data associated with different users from the specified user has been stored in the storage, the display device to display a confirmation screen, wherein the confirmation screen is configured to include at least user information indicating users associated with the print data stored in the storage, and not to include information indicating a name of the print data stored in the storage.

\* \* \* \* \*